(12) United States Patent
Eiriksson et al.

(10) Patent No.: US 7,715,436 B1
(45) Date of Patent: May 11, 2010

(54) METHOD FOR UDP TRANSMIT PROTOCOL OFFLOAD PROCESSING WITH TRAFFIC MANAGEMENT

(75) Inventors: Asgeir Thor Eiriksson, Sunnyvale, CA (US); Wael Noureddine, Mountain View, CA (US)

(73) Assignee: Chelsio Communications, Inc., Sunnyvale, CA (US)

( * ) Notice: Subject to any disclaimer, the term of this patent is extended or adjusted under 35 U.S.C. 154(b) by 1022 days.

(21) Appl. No.: 11/282,933

(22) Filed: Nov. 18, 2005

(51) Int. Cl.
*H04J 3/22* (2006.01)
(52) U.S. Cl. .................. 370/473; 370/230
(58) Field of Classification Search ............ 370/230, 370/412, 521; 709/232
See application file for complete search history.

(56) References Cited

U.S. PATENT DOCUMENTS

| | | | |
|---|---|---|---|
| 4,445,116 A | 4/1984 | Grow | |
| 4,533,996 A | 8/1985 | Hartung et al. | |
| 5,497,476 A | 3/1996 | Oldfield et al. | |
| 5,778,189 A | 7/1998 | Kimura et al. | |
| 6,087,581 A | 7/2000 | Emmer et al. | |
| 6,226,680 B1 | 5/2001 | Boucher et al. | 709/230 |
| 6,240,094 B1 | 5/2001 | Schneider | |
| 6,247,060 B1 | 6/2001 | Boucher et al. | 709/238 |
| 6,334,153 B2 | 12/2001 | Boucher et al. | 709/230 |
| 6,389,479 B1 | 5/2002 | Boucher et al. | 709/243 |
| 6,393,487 B2 | 5/2002 | Boucher et al. | 709/238 |
| 6,397,316 B2 | 5/2002 | Fesas, Jr. | |
| 6,401,177 B1 | 6/2002 | Koike | |
| 6,427,171 B1 | 7/2002 | Craft et al. | 709/230 |
| 6,427,173 B1 | 7/2002 | Boucher et al. | 709/238 |
| 6,434,620 B1 | 8/2002 | Boucher et al. | 709/230 |
| 6,470,415 B1 | 10/2002 | Starr et al. | 711/104 |
| 6,510,164 B1 | 1/2003 | Ramaswamy et al. | |
| 6,591,302 B2 | 7/2003 | Boucher et al. | 709/230 |
| 6,594,268 B1 | 7/2003 | Aukia et al. | |
| 6,625,671 B1 | 9/2003 | Collette et al. | |
| 6,658,480 B2 | 12/2003 | Boucher et al. | 709/239 |
| 6,681,244 B1 | 1/2004 | Cross et al. | |
| 6,687,758 B2 | 2/2004 | Craft et al. | 709/250 |
| 6,697,868 B2 | 2/2004 | Craft et al. | 709/230 |
| 6,701,372 B2 * | 3/2004 | Yano et al. | 709/232 |
| 6,708,223 B1 | 3/2004 | Wang et al. | |

(Continued)

OTHER PUBLICATIONS

Clark et al., "*An Analysis of TCP Processing Overhead*," IEEE Communications Magazine, Jun. 1989, pp. 23-29.

(Continued)

*Primary Examiner*—Albert T Chou
(74) *Attorney, Agent, or Firm*—Beyer Law Group LLP

(57) ABSTRACT

Transfer of data over UDP is facilitated between at least one application and at least one peer via a network. Data destined for the at least one peer is provided from the at least one application for transmission to the peer via the network. The data is encapsulated into UDP segments, which may further be fragmented according to packet size or application level framing constraints. Modulation event tokens are managed, and protocol processing of the data with the at least one peer is based in part on a result of the modulation event tokens managing such that data is caused to be transmitted to the at least one peer via the network nominally with desired data transmission rate characteristics. A result of the modulation event processing step is fed back to the to the modulation event tokens managing.

25 Claims, 5 Drawing Sheets

U.S. PATENT DOCUMENTS

| | | | | |
|---|---|---|---|---|
| 6,708,232 | B2 | 3/2004 | Obara | |
| 6,717,946 | B1 | 4/2004 | Hariguchi et al. | |
| 6,751,665 | B2 | 6/2004 | Philbrick et al. | 709/224 |
| 6,757,245 | B1* | 6/2004 | Kuusinen et al. | 370/230 |
| 6,757,746 | B2 | 6/2004 | Boucher et al. | 709/250 |
| 6,792,502 | B1 | 9/2004 | Pandya et al. | |
| 6,798,743 | B1 | 9/2004 | Ma et al. | |
| 6,807,581 | B1 | 10/2004 | Starr et al. | 709/250 |
| 6,813,652 | B2 | 11/2004 | Stadler et al. | |
| 6,862,648 | B2 | 3/2005 | Yatziv | |
| 6,925,055 | B1 | 8/2005 | Erimli et al. | |
| 6,941,386 | B2 | 9/2005 | Craft et al. | 709/250 |
| 7,031,267 | B2 | 4/2006 | Krumel | |
| 7,093,099 | B2 | 8/2006 | Bodas et al. | |
| 7,114,096 | B2 | 9/2006 | Freimuth et al. | |
| 7,133,902 | B2 | 11/2006 | Saha et al. | |
| 7,133,914 | B1 | 11/2006 | Holbrook | |
| 7,191,318 | B2 | 3/2007 | Tripathy et al. | |
| 7,239,642 | B1 | 7/2007 | Chinn et al. | |
| 7,254,637 | B2 | 8/2007 | Pinkerton et al. | |
| 7,260,631 | B1 | 8/2007 | Johnson et al. | |
| 7,284,047 | B2 | 10/2007 | Barham et al. | |
| 7,313,623 | B2 | 12/2007 | Elzur et al. | |
| 7,376,147 | B2 | 5/2008 | Seto et al. | |
| 7,408,906 | B2 | 8/2008 | Griswold et al. | |
| 7,453,892 | B2 | 11/2008 | Buskirk et al. | |
| 7,493,427 | B2 | 2/2009 | Freimuth et al. | |
| 2001/0010046 | A1 | 7/2001 | Muyres et al. | |
| 2001/0036196 | A1 | 11/2001 | Blightman et al. | 370/465 |
| 2001/0037406 | A1 | 11/2001 | Philbrick et al. | 709/250 |
| 2002/0039366 | A1 | 4/2002 | Sano | |
| 2002/0087732 | A1 | 7/2002 | Boucher et al. | 709/250 |
| 2002/0091844 | A1 | 7/2002 | Craft et al. | 709/230 |
| 2002/0095519 | A1 | 7/2002 | Philbrick et al. | 709/250 |
| 2002/0156927 | A1 | 10/2002 | Boucher et al. | 709/250 |
| 2002/0161919 | A1 | 10/2002 | Boucher et al. | 709/238 |
| 2003/0018516 | A1 | 1/2003 | Ayala et al. | |
| 2003/0035436 | A1 | 2/2003 | Denecheau et al. | |
| 2003/0140124 | A1 | 7/2003 | Burns | 709/220 |
| 2003/0200284 | A1 | 10/2003 | Philbrick et al. | 709/219 |
| 2003/0204631 | A1 | 10/2003 | Pinkerton et al. | |
| 2004/0003094 | A1 | 1/2004 | See | |
| 2004/0003126 | A1 | 1/2004 | Boucher et al. | 709/250 |
| 2004/0028069 | A1 | 2/2004 | Tindal et al. | |
| 2004/0030745 | A1 | 2/2004 | Boucher et al. | 709/203 |
| 2004/0042487 | A1 | 3/2004 | Ossman | |
| 2004/0054813 | A1 | 3/2004 | Boucher et al. | 709/250 |
| 2004/0062245 | A1 | 4/2004 | Sharp et al. | 370/392 |
| 2004/0062246 | A1 | 4/2004 | Boucher et al. | 370/392 |
| 2004/0064578 | A1 | 4/2004 | Boucher et al. | 709/236 |
| 2004/0064589 | A1 | 4/2004 | Boucher et al. | 709/250 |
| 2004/0064590 | A1 | 4/2004 | Starr et al. | 709/250 |
| 2004/0073703 | A1 | 4/2004 | Boucher et al. | 709/245 |
| 2004/0078480 | A1 | 4/2004 | Boucher et al. | 709/237 |
| 2004/0088262 | A1 | 5/2004 | Boucher et al. | 705/65 |
| 2004/0100952 | A1 | 5/2004 | Boucher et al. | 370/389 |
| 2004/0111535 | A1 | 6/2004 | Boucher et al. | 709/250 |
| 2004/0117509 | A1 | 6/2004 | Craft et al. | 709/250 |
| 2004/0158640 | A1 | 8/2004 | Philbrick et al. | 709/230 |
| 2004/0158793 | A1 | 8/2004 | Blightman et al. | 714/758 |
| 2004/0165592 | A1 | 8/2004 | Chen et al. | |
| 2004/0190533 | A1 | 9/2004 | Modi et al. | |
| 2004/0199808 | A1 | 10/2004 | Freimuth et al. | |
| 2004/0213235 | A1 | 10/2004 | Marshall et al. | |
| 2004/0240435 | A1 | 12/2004 | Boucher et al. | 709/250 |
| 2005/0021949 | A1 | 1/2005 | Izawa et al. | 709/219 |
| 2005/0071490 | A1 | 3/2005 | Craft et al. | 709/230 |
| 2005/0083935 | A1 | 4/2005 | Kounavis et al. | |
| 2005/0122037 | A1 | 6/2005 | Maruyama et al. | |
| 2005/0122986 | A1 | 6/2005 | Starr et al. | 370/412 |
| 2005/0125195 | A1 | 6/2005 | Brendel | |
| 2005/0135378 | A1 | 6/2005 | Rabie et al. | |
| 2005/0135412 | A1 | 6/2005 | Fan | |
| 2005/0147126 | A1 | 7/2005 | Qiu et al. | |
| 2005/0190787 | A1 | 9/2005 | Kuik et al. | |
| 2005/0216597 | A1 | 9/2005 | Shah et al. | |
| 2005/0259644 | A1 | 11/2005 | Huitema et al. | |
| 2005/0259678 | A1 | 11/2005 | Gaur | |
| 2005/0289246 | A1 | 12/2005 | Easton et al. | |
| 2006/0031524 | A1 | 2/2006 | Freimuth | |
| 2006/0039413 | A1* | 2/2006 | Nakajima et al. | 370/521 |
| 2006/0075119 | A1 | 4/2006 | Hussain | |
| 2006/0080733 | A1 | 4/2006 | Khosmood et al. | |
| 2006/0133267 | A1 | 6/2006 | Alex et al. | |
| 2006/0168649 | A1 | 7/2006 | Venkat et al. | |
| 2006/0206300 | A1 | 9/2006 | Garg et al. | |
| 2006/0209693 | A1 | 9/2006 | Davari et al. | |
| 2006/0221946 | A1 | 10/2006 | Shalev et al. | |
| 2006/0281451 | A1 | 12/2006 | Zur | |
| 2007/0064737 | A1 | 3/2007 | Williams | |
| 2007/0070901 | A1 | 3/2007 | Aloni et al. | |
| 2007/0110436 | A1 | 5/2007 | Bennett | |
| 2007/0201474 | A1 | 8/2007 | Isobe | |
| 2008/0002731 | A1 | 1/2008 | Tripathy et al. | |
| 2008/0016511 | A1 | 1/2008 | Hyder et al. | |
| 2008/0043750 | A1 | 2/2008 | Keels et al. | |
| 2008/0232386 | A1* | 9/2008 | Gorti et al. | 370/412 |

OTHER PUBLICATIONS

Woodside et al., "*The Protocol Bypass Concept for High Speed OSI Data Transfer*," Research Paper. Available at:http://citeseer.ist.psu.edu/cache/papers/cs/26104/http:zSzzSzwww.sce.carleton.cazSzftpzSzpubzSzcmwzSzbpjan90.pdf/woodside90protocol.pdf.

Rütsche et al., "*TCP/IP on the Parallel Protocol Engine*," High Performace Networking, (IV, C-14), Elsevier Science Publishers, B.V. North Holland 1993.

Thia et al., "*High-Speed OSI Protocol Bypass Algorithm with Window Flow Control*," IFIP WG6.4 Third International Workshop on Protocols for High-Speed Networks, Stockholm, Sweden, May 13-15, 1992, pp. 53-68.

Thia et al., "*A Reduced Operation Protocol Engine (ROPE) for a Multiple-Layer Bypass Architecture*," Protocols for High-Speed Networks IV, 4th IFIP International Workshop, Aug. 10-12, 1994, Vancouver, B.C., Canada, pp. 224-239.

Rütsche et al., "*Architectures of Multimedia Communication Subsystems*," IFIP Transactions; vol. C-23 archive, Proceedings of the IFIP TC6 International Conference on Information Networks and Data Communication table of contents, pp. 217-230, Year of Publication: 1994.

Dalton et al., "*Afterburner: Architectural Support for High-Performance Protocols*," http://www.hpl.hp.com/techreports/93/HPL-93-46.pdf, Jul. 1993, 18 Pages.

TRM Technologies, Inc., "*L4/L7 Switching*," Downloaded from http://www.trm.ca/pages/t-tech7.html on Feb. 16, 2006, 3 Pages.

Madsen et al.,"*Wireless Data Communication*," Fall 2003 Presentation, Wireless Networks Division (WING), Allborg University.

Yocum et al., "*Anypoint: Extensible Transport Switching on the Edge*," Proceedings of the 4th USENIX Symposium on Internet Technologies and Systems, Mar. 26-28, 2003, Seattle, WA, USA.

Office Action in U.S. Appl. No. 10/474,500, mailed Oct. 4, 2007.
Office Action in U.S. Appl. No. 11/137,146, mailed Mar. 5, 2008.
Office Action in U.S. Appl. No. 11/137,140, mailed Feb. 5, 2008.
Office Action in U.S. Appl. No. 11/250,894, mailed Jun. 26, 2008.
Notice of Allowance in U.S. Appl. No. 10/474,500, mailed Jul. 1, 2008.
Allowed Claims from U.S. Appl. No. 10/474,500.
Office Action in U.S. Appl. No. 11/217,661, mailed Sep. 18, 2008.
Office Action in U.S. Appl. No. 11/330,898, mailed Oct. 8, 2008.
Office Action in U.S. Appl. No. 11/137,146, mailed Nov. 3, 2008.
Office Action in U.S. Appl. No 11/356,850 mailed Dec. 3, 2008.
U.S. Appl. No. 60/690,465, filed Jun. 14, 2005.
U.S. Appl. No. 60/718,418, filed Sep. 19, 2005.
Office Action in U.S. Appl. No. 11/250,894 mailed Jan. 26, 2009.

Office Action in U.S. Appl. No. 11/137,140 mailed Apr. 1, 2009.
Office Action in U.S. Appl. No. 11/130,898 mailed Apr. 2, 2009.
Office Action in U.S. Appl. No. 11/747,790 mailed May 12, 2009.
Office Action in U.S. Appl. No. 11/747,793 mailed Jun. 8, 2009.
Notice of Allowance in U.S. Appl. No. 11/313,003, mailed Jun. 8, 2008.
Allowed Claims from U.S. Appl. No. 11/313,003.
Office Action in U.S. Appl. No. 11/217,661 mailed Jun. 9, 2009.
Pratt, Ian and Fraser, Keir, "Arsenic: A User-Accessible Gigabit Ethernet Interface," INFOCOM 2001. Twentieth Annual Joint Conference of the IEEE Computer and Communications Societies. Proceedings. IEEE, vol. 1, Issue, 2001 pp. 67-76 vol. 1.
Office Action in U.S. Appl. No. 11/137,140 mailed Mar. 31, 2009.
Office Action in U.S. Appl. No. 11/137,146, mailed Jun. 23, 2009.
Office Action in U.S. Appl. No. 11/735,861, mailed Aug. 6, 2009.
Office Action in U.S. Appl. No. 11/137,140, mailed Aug. 21, 2009.
Office Action in U.S. Appl. No. 11/747,650, mailed Aug. 27, 2009.
Office Action in U.S. Appl. No. 11/250,894, mailed Sep. 15, 2009.
Notice of Allowance in U.S. Appl. No. 11/356,850, mailed Jun. 26, 2009.
Allowed Claims from U.S. Appl. No. 11/356,850.
Notice of Allowance in U.S. Appl. No. 11/330,898, mailed Sep. 23, 2009.
Allowed Claims in U.S. Appl. No. 11/330,898.
Final Office Action in U.S. Appl. No. 11/747,790, mailed Nov. 5, 2009.

* cited by examiner

Fragmentation

Segmentation

METHOD FOR UDP TRANSMIT PROTOCOL OFFLOAD PROCESSING WITH TRAFFIC MANAGEMENT

PRIORITY CLAIM

This application is related to U.S. patent application Ser. No. 11/217,661, filed Aug. 31, 2005 and entitled "Protocol offload transmit traffic management," which is incorporated herein by reference in its entirety.

TECHNICAL FIELD

The present invention relates to the offload processing for User Datagram Protocol (UDP) and for other "connectionless" protocols and, in particular, relates to subdividing data for transmission over a network as well as transmit traffic management.

BACKGROUND

Popular Internet transport protocols include the Transmission Control Protocol (TCP) and the User Datagram Protocol (UDP). The Transmission Control Protocol specifies multiplexing, checksum, and in-order reliable delivery with congestion and flow control. In contrast, UDP is a simpler protocol, which specifies multiplexing and checksum, but not congestion and flow control. Thus, UDP uses fewer processing resources in implementation than does TCP.

Given its relative complexity, protocol offload processing is commonly applied to TCP. Checksum offload for UDP is common, too. For example, many modern network interface cards (NIC's) provide checksum computation and insertion on the transmitting side for UDP, and checksum checking on the receiving side for UDP.

SUMMARY

Transfer of data is facilitated between at least one application and at least one peer via a network according to UDP or other connectionless protocol. Application payload data destined for the peer is provided from the at least one application, executing on a host computer, to intelligent network interface circuitry for transmission to the at least one peer via the network.

Processing of the application payload data by the intelligent network interface circuitry includes subdividing the application data based on packet size criteria with respect to the network. Modulation event tokens are managed, and protocol processing of the data is based in part on a result of the modulation event tokens managing such that protocol processed data is caused to be transmitted to the peer via the network nominally with desired data transmission rate characteristics.

BRIEF DESCRIPTION OF FIGURES

FIG. 2*a* illustrates the payload subdivision in the form of segmentation, whereas

DETAILED DESCRIPTION

There is benefit to improve offload support to enhance the UDP protocol and other "connectionless" protocols, preferably without interfering with transmission of data according to the protocol. (While the discussion herein is heavily directed to UDP, many or all of the aspects may also be applied more generically to "connectionless" protocols.)

In accordance with one aspect, support is provided for segmentation offload processing in a network adapter (e.g., a network interface card, or NIC). This includes processing for the network adaptor to receive from the host an amount of data to be sent from the host to a peer via a network, and segmenting the data into a desired network frame size.

UDP messages (segments) are conventionally encapsulated in one or more Internet Protocol datagrams. Each datagram may contain a complete UDP segment or part thereof. In the case where an IP datagram contains only a part of a complete UDP segment, the IP datagram is considered a fragment of the whole message.

UDP processing conventionally does not consider (or is not affected by) network and/or peer characteristics. For example, UDP does not conventionally specify rate control, flow control or congestion control mechanisms. The lack of such mechanisms can lead to UDP transmit traffic exceeding the resources of the network or of the receiving end, which may lead to congestion, packet loss, and performance degradation.

Methods and apparatus are described to manage UDP data traffic at the sending end to address these issues. Network adapters are available to provide UDP support in the form of computing and inserting payload and header checksums. However, UDP processing can benefit from additional offload processing by an intelligent network adapter.

Figure 1:
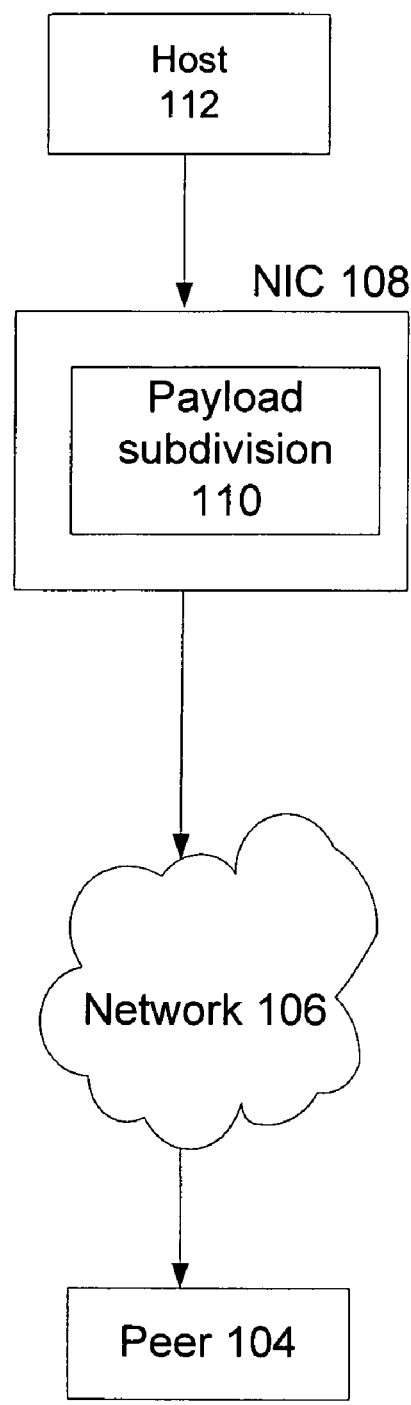
FIG. 1 illustrates an architecture in which payload subdivision of UDP application payload is performed by an intelligent offload device.
Figure 2B:
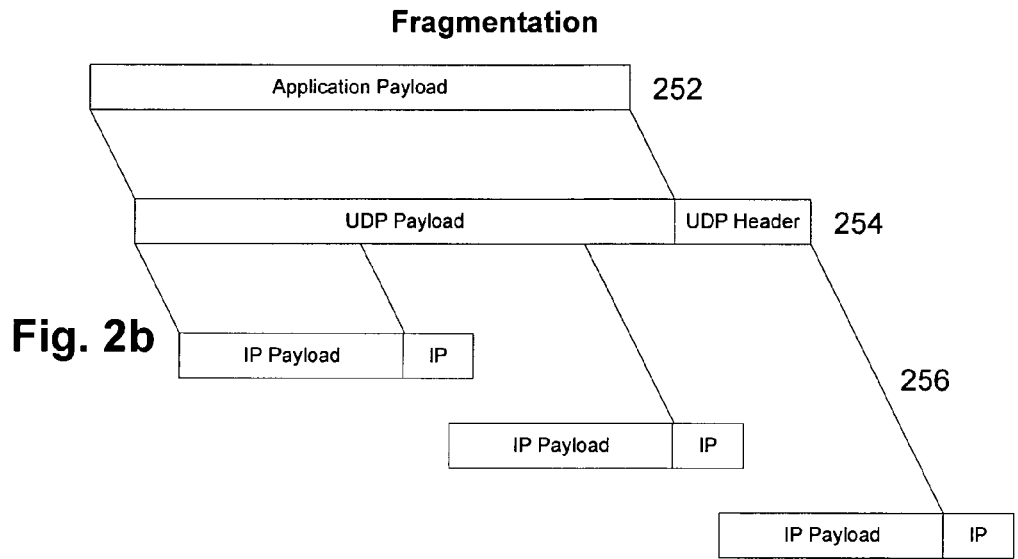
FIG. 2*b* illustrates the payload subdivision in the form of fragmentation.
Figure 2A:
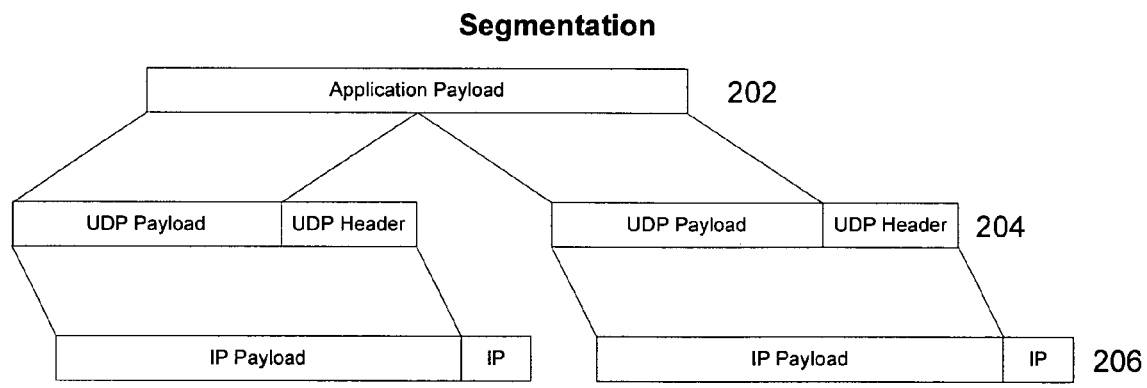

We first describe an aspect relating to segmentation and fragmentation, with reference to FIGS. 1, 2*a* and 2*b*. In particular, as broadly shown in FIG. 1, a host 102 is in communication with a peer 104 via a network 106. An intelligent network adaptor 108 provides an interface between the host 102 and the network 106. The intelligent network adaptor 108 provides payload subdivision functionality 110 for UDP protocol data transmission.

Payload subdivision functionality includes accepting "large" UDP payload from an application executing on a host and subdividing the large UDP payload into parts, prior to sending UDP information over the network to a peer. Offload processing may also include encapsulating each part into a transport layer packet by, for example, encapsulating each part, with or without the transport header, into a network layer packet before transmitting the part to the network. (It is noted that a payload may be common to multiple streams. Therefore, the same payload may be subdivided and transmitted multiple times or sent to a multicast network address. This may occur, for example, when the application is serving media content, and the media content is common for different users.)

As shown, for example, in FIG. 2*a*, an application payload 202 may be subdivided into a number of UDP segments 204, each UDP segment 204 encapsulated in an IP datagram 206. As shown in FIG. 2*b*, it is also possible that an application payload 252 results in just one UDP segment 254 and a number of IP datagrams 256, each IP datagram 256 carrying a fragment of the segment, including one IP datagram 258 that carries the UDP header.

Referring specifically to FIG. 2a, the subdivision of application payload 202 into UDP segments 204 may correspond to application layer framing boundaries. The application layer framing may be implicit such as, for example, contained in the application payload 202. On the other hand, application layer framing may be explicit, as an example, with framing headers inserted in the application payload 202 and removed by the network adapter 108 before transmission over the network 106. In addition, the segmentation may be according to a desired maximum packet size.

With regard to application layer framing, packets are typically queued for transmission in a memory on the NIC. In order to recover application layer framing information, it may be necessary to read the framing information from the memory before transmitting each packet. As an example, the framing information associated with each packet may include a number of bytes that indicate the size of the packet. These bytes could be appended or pre-pended to the packet. In another example, the framing information is provided out of band, in a manner that allows the NIC to match the information with the associated packet. As an example, if the framing information and the packets are processed in two different First In First Out (FIFO) queues, it is possible to associate the framing information at the head of the framing FIFO to the corresponding packet at the head of the packet FIFO.

When UDP payload is segmented (i.e., it results in multiple UDP segments), it may be desirable to minimize the delay before the first segment is sent out on the network. Cut-through processing can be employed to generate and send out the first segment on the fly as the payload is streamed to the network adapter. The payload remainder may be stored in memory on the adapter, and subsequently sent out in other segments.

Now discussing fragmentation, as opposed to segmentation, the fragmentation of the UDP segment may be performed according to the Internet Protocol. The Internet Protocol specifies that each fragment carries a pointer to the offset in the transport layer segment at which the fragment starts, and that it is indicated if there are more fragments expected.

The payload subdivision functionality 110 may be according to a desired maximum packet size. It is possible to combine the two criteria for payload subdivision, whereby a UDP packet that exceeds the desired maximum packet size is fragmented into multiple parts, none of which exceeds the maximum packet size.

When a UDP segment is fragmented, it may be desirable to minimize the delay before the first IP datagram for the UDP segment appears on the network. Since the transport layer checksum is computed over the whole of the UDP payload and since the transport layer checksum appears in the UDP header, in some examples, the UDP header is sent last. Otherwise, if the UDP header is sent in the first IP datagram packet, a large delay may be incurred before the first packet can be sent.

FIGS. 2a and 2b illustrate the two cases (FIG. 2a, segmentation; FIG. 2b, fragmentation) and illustrates how the offload processing can retain the UDP header and send the UDP header after the last payload byte is processed. The fragment containing the header naturally occurs at offset zero into the UDP segment, and indicates that more fragments are expected. The fragment containing the UDP header may carry payload data, although it may be preferable not to do so.

Having discussed segmentation and fragmentation we now discuss UDP protocol offload processing to modulate the transmission of the IP datagrams across the network, to have particular desired data rate characteristics. As an example, data transmission may be modulated based on a desired peak transmission rate to, for example, operate to defined quality of service transmission characteristics for particular customers, smooth out (i.e., not propagate) jitter from a data source, and/or attempt to match the receive capabilities of receiving peer devices. A similar concept has been described in U.S. patent application Ser. No. 11/217,661, filed Aug. 31, 2005 and entitled "Protocol offload transmit traffic management" (and incorporated herein by reference in its entirety).

Figure 3:
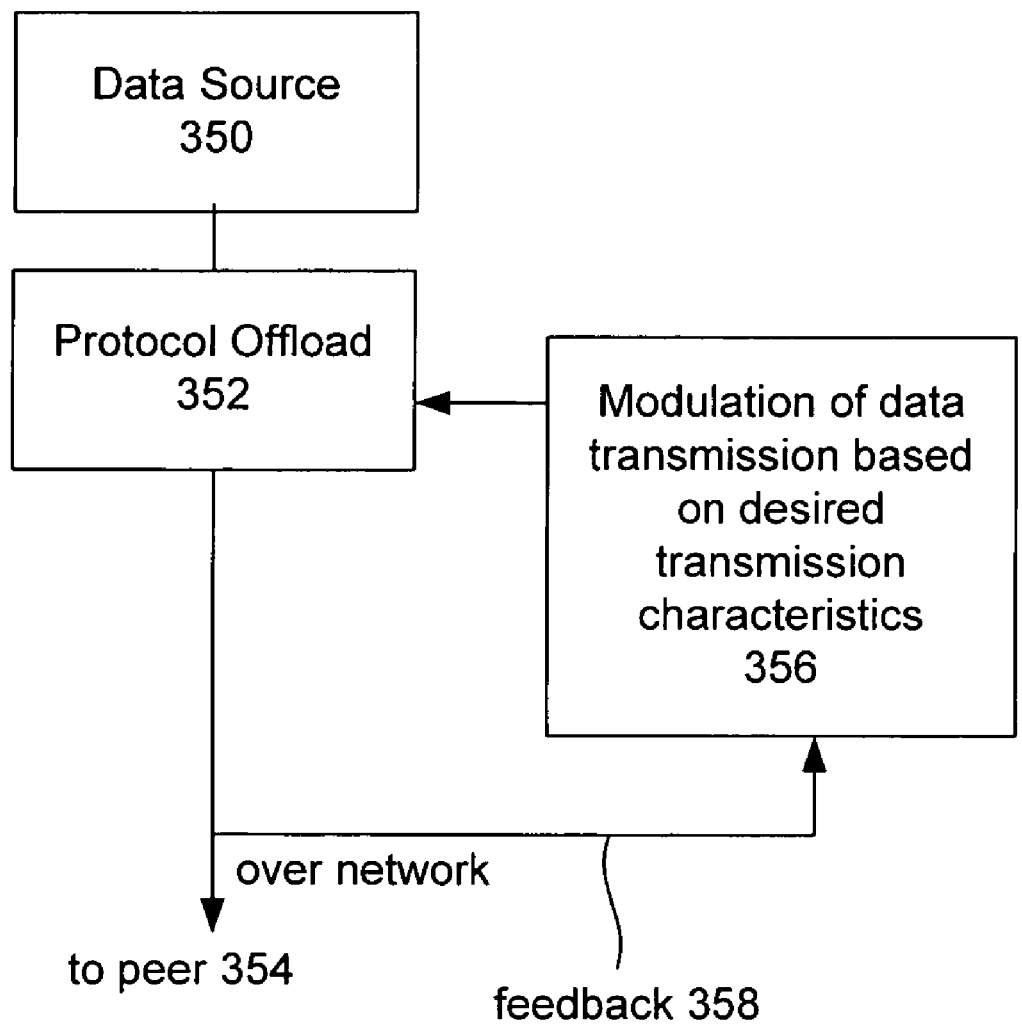
FIG. 3 broadly illustrates an architecture for modulating data transmission in protocol offload processing.

FIG. 3 broadly illustrates modulating data transmission from protocol offload processing. A data source 350 is a source of data to be transmitted. For example, the data source 50 may be a host computer. A protocol offload processing device 352 (such as a network interface controller, or NIC) handles transmission of data, according to the protocol (such as, for example, UDP) to a peer 354 over a network. A data transmission modulator 356 controls the protocol offload processing (which, in this case, is traffic management) according to desired data transmission characteristics and based on feedback 358 (e.g., modulation event tokens) from the protocol offload processing device 352 to the data transmission modulator 356.

Broadly speaking, the traffic management controls the delivery of data across the network to nominally have desired characteristics, and a transmission traffic management capability may be provided for protocol offload processing accomplished using various architectures. Typically, the desired characteristics for data delivery are provided from a host computer. In some cases, processing more closely associated with the protocol processing determines the desired characteristics, typically based at least partly on characteristics of the network.

We now describe a specific example of protocol offload processing and modulating the transmission of data across the network. In the specific example, a flow processor architecture for protocol offload processing is employed, and a traffic management capability manages the operation of the flow processor (or, at least, portions of the flow processor) to control the flow of data communication via the network between the protocol offload processing and peer devices. While the processor architecture in the described example is a flow processor architecture, other architectures (perhaps not even processors) may be employed.

Figure 4:
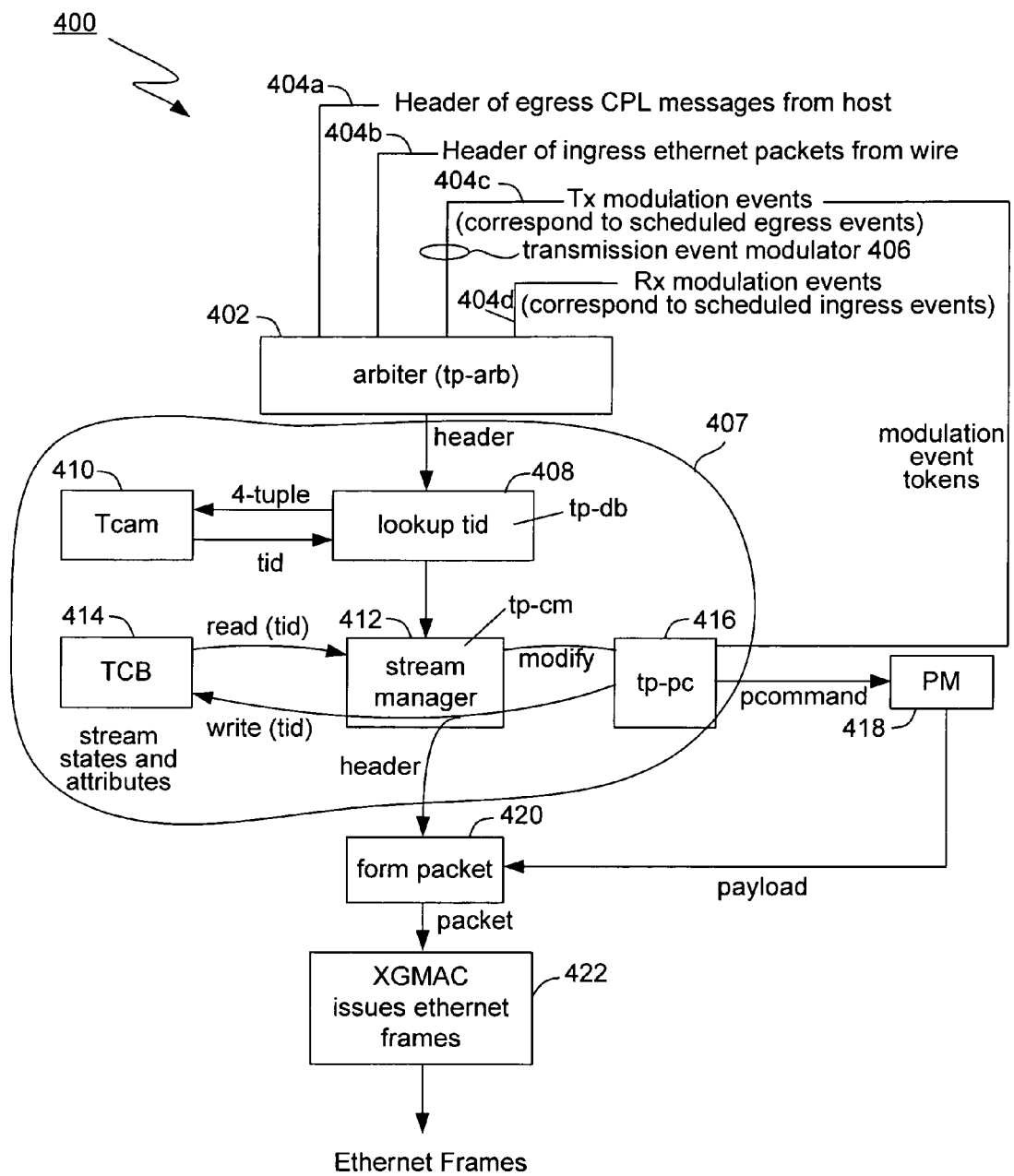
FIG. 4 illustrates an architecture of a flow processor to handle protocol offload processing and including data transmission modulation (traffic management) capability.

Turning now to FIG. 4, the flow processor architecture of the interface device 400, having transmission traffic management capability, is described. An arbiter 402 arbitrates among various signals such as headers of control messages from a host (404a), and transmission modulation event tokens (404c). Before proceeding to describe the remainder of the FIG. 3 flow processor architecture, it is noted by way of introduction that the transmission modulation event tokens 404c, provided to the arbiter 402 via a transmission event modulator 406, are employed to modulate the transmission of data across the network from the protocol offload interface device. It is noted that the arbiter 402 is a feature of the particular flow processor architecture of the FIG. 2 device and would typically have only an indirect effect on the transmission traffic management capability.

When the arbiter 402 operates to allow a transmission modulation event through (the source of the transmission modulation event tokens, and including the transmission event modulator 406, is discussed in detail later), the transmission modulation event includes a stream state identifier (tid).

In particular, the stream manager 412 provides the tid to a transmission control block (TCB) 414. The TCB 414 provides the current state and attributes for the stream. As discussed in greater detail later, the stream may correspond to a 4-tuple, for example, or to any other granularity of operation. Different streams may have different granularities. Based on the current stream state and attributes provided from the TCB 414, the stream manager 412 determines how to appropriately modify the stream state. The stream manager 412 provides the payload command manager 416 an indication of the modification to the stream state, as well as providing the indication of the modification back to the TCB 414. The read, modify and write of the stream state and attributes is done in an atomic operation Based on the indication of the modification, the payload command manager 416 issues one or more appropriate payload commands to the payload manager block 418. Furthermore, as appropriate based on the modified stream state and the availability of additional data to send for the stream, the payload command manager 416 provides transmission modulation event tokens to the transmission event modulator 406.

In addition to providing the indication of the modification to the payload command manager 416, the stream manager 412 provides an appropriate packet header for data transmission to a form packet block 420. Meanwhile, the payload manager block 418 provides the corresponding payload to the form packet block 420 (as discussed above, based on payload commands from the payload command manager 416). The form packet block 420 combines the packet header and corresponding payload into a packet for transmission across the network. A network protocol block 422 forms appropriate units of data for transmission across the network. In the FIG. 4 example, packet data is transmitted across the network in an Ethernet-encapsulated manner, so the network protocol block 412 issues Ethernet frames for transmission across the network to a peer device.

As discussed above, the transmission modulation event tokens originate in the payload command manager 416 and are provided to the transmission event modulator 406. In the example discussed above, a transmission modulation event is provided to the transmission event modulator 406 as the ultimate result of the arbiter 402 operating to allow a transmission modulation event through.

Figure 5:
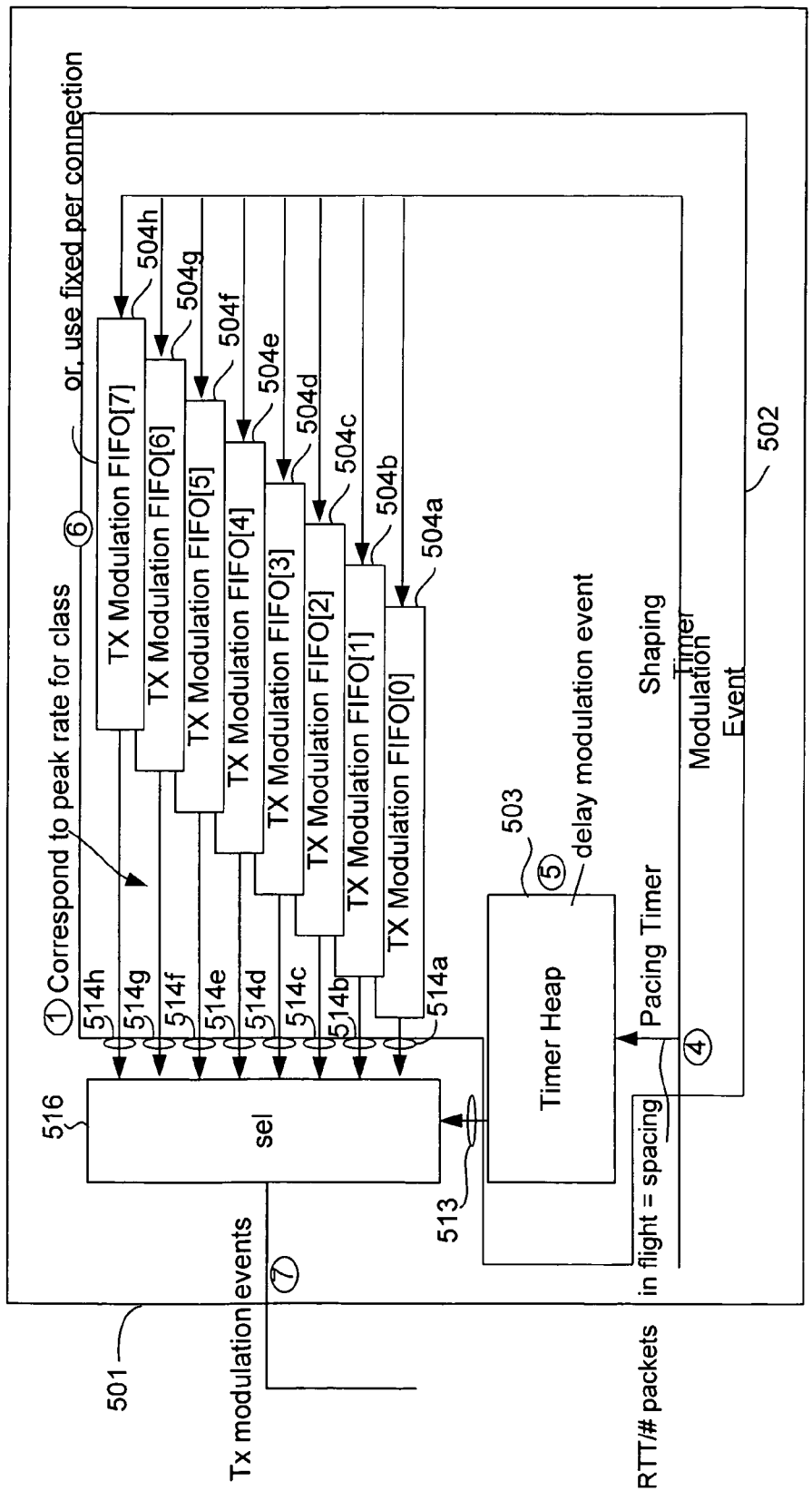
FIG. 5 illustrates a more detailed example of the traffic management portion of the FIG. 4 architecture.

We now discuss the operation of a detailed example of the transmission event modulator 406, with specific reference to the FIG. 5 transmission event modulator 501 (an example of the transmission event modulator 406 in FIG. 4) and also with reference to FIG. 4. Before describing FIG. 5 in detail, however, we first discuss some general aspects of data transmission modulation. In general, the data transmission modulation discussed here relates to scheduling packet transmissions according to one or more desired data rate characteristics.

Shaping limits the peak rate at which data is transmitted over the network for a particular stream or class of streams. This capability has potentially many uses. For example, shaping can be used to provide different quality of service for different customers, based on an amount the customers pay, for example.

Shaping can also be useful when data coming from a source is inherently jittery. For example, an application reading data from disk storage may provide data with jitter (e.g., there may be bursts in the data when a read head has been moved over the data to be read). As another example, when a server is connected to a very high speed link (e.g., 10 Gbps) serving clients connected to 10/100 Mbps or even 1 Gbps links, data may be sent from the server to the clients up to 1,000 times faster than the client links can handle. In such a case, congestion and packet loss can result.

Yet another example area where shaping can be useful is when a media server streams video or audio data which is encoded at a certain rate. By shaping the sending rate to be close to the stream encoding rate, it is possible to implement receiving devices with limited buffering resources and therefore reduce their cost.

Thus, in general, shaping can be used to limit the maximum data transmission rate to accommodate characteristics of the path (including endpoints) or to impose characteristics on the transmissions, even if not to accommodate characteristics of the path.

We now discuss FIG. 5 in some detail. Referring to FIG. 5, a transmission event modulator 501 (as discussed above, a specific example of the FIG. 4 transmission event modulator 406) includes a data structure 502 provided to hold transmission modulation event tokens sent by the payload command manager 416 to the transmission event modulator 501.

In the FIG. 5 example, the FIFO's 504a through 504h (generally, 504) are usable for providing a shaping function. In general, then, modulation event tokens are stored into the appropriate portion of the data structure based on desired data transmission characteristics for the stream to which the modulation event token corresponds. For example, each FIFO 504 may correspond to a different Quality of Service promise.

We now discuss shaping. In one example, there are two types of shaping FIFO's. One type of shaping FIFO provides control over the inter-packet delay for a group (class) of streams, while the second type provides control over the inter-packet delay within a single stream. In one example, all event tokens for a particular FIFO cause the same inter-packet delay (i.e., out of that FIFO), so only one inter-packet delay is supported by each FIFO.

The mapping of streams to FIFO's determines the shaping type (per-class or per-stream). The first type of shaping (per class) may be accomplished by having a single FIFO (modulation queue) being configured to graduate modulation event tokens based on the time elapsed since the last token was graduated. The determination of the delay between graduations may be based on an indication of the size of each packet. The second type of shaping (per stream) may be accomplished by having a single FIFO configured to graduate timers based on a deadline carried by each timer. Whenever a timer is inserted in the FIFO, its graduation time is set to a fixed delay from the current time. The overall effect is that data for each stream is transmitted at the same fixed rate, whereas the first type of shaping realizes a fixed rate on a per-class basis.

A third type of shaping is provided by the use of a timer heap 503. A heap graduates modulation timers based on an indication of the delay desired for each timer. This characteristic allows the heap to provide different shaping rates to different streams.

In some examples, triggering of a timer associated with the heap 503 or a FIFO 514 means only that a modulation event in the heap 503 or the FIFO 514 is ready to graduate out of the heap 503 or the FIFO 514 and into the arbiter 402 (FIG. 4), not that the modulation event actually does so graduate. That is, as mentioned above, in some examples, an arbiter/selector 516 is provided at the output of the heap 503 and the FIFO's 514 to arbitrate among those modulation event tokens that are ready to graduate. The arbiter 516 may be configured according to, for example, a priority scheme, round robin scheme, or other arbitration scheme.

For example, a weighted round robin scheme may be employed, where the weight for a modulation event varies according to how much data there is to send for the stream or group of streams corresponding to that modulation event.

As mentioned above, although not part of the UDP protocol (or of other "connectionless" protocols), it may be desirable to control the flow of data, generated by an application, over the network according to a flow control scheme. The flow control may be handled entirely in an offload manner, such that it is transparent to the application. In addition, because the flow control scheme is not part of the UDP protocol, control information is communicated "out of band."

The flow control scheme may, for example, limit the flow of data based on a window size, similar to the TCP protocol. For example, the window size may be communicated from the receiving peer(s). In one example, the window size corresponds to an amount of buffering available at the receiver(s), again similar to the TCP protocol. In another example, the window size is based in part on the state of the network, again similar to the TCP protocol.

The window size may place a limit on the number of bytes that can be sent, or a limit on the number of packets that may be sent, or both. For example, the intelligent network interface circuitry transmits a packet and subtracts the size of the packet in bytes from the window. If the window size is not large enough to accommodate sending a new packet, then the intelligent network interface circuitry suspends further transmission until the window is increased again. For example, the window increase may correspond to receiving credits from the receiving peer. Maintenance of the window size is accomplished by the stream manager 412, for example, in the FIG. 4 configuration.

As mentioned above, the flow control scheme may operate according to various different granularities. One may describe the packet group corresponding to the granularity chosen as belonging to a single UDP stream. In some examples, flow control is implemented on a per 4-tuple basis where, for UDP, the 4-tuple includes the source host IP address, the destination host IP address, the source host UDP port number and destination host UDP port number. In other examples, the flow control is implemented on a 2-tuple basis (source host IP address and destination host IP address). In other examples, the flow control is implemented for other granularities.

Unlike TCP, which uses a field in the TCP header, the UDP protocol does not directly accommodate the communication of flow control information. Rather, the flow control scheme for UDP uses "out of band" communication for flow control. Furthermore, the application and host need not have knowledge of or deal with the flow control, as the flow control scheme may terminate in the NIC card.

What is claimed is:

1. A method of operating intelligent network interface circuitry to facilitate the transfer of application data between at least one application, executing on a host, and at least one peer via a network, wherein application data destined for the at least one peer is provided from the at least one application in frames, via the network interface circuitry, for transmission from the intelligent network interface circuitry to the at least one peer via the network encapsulated according to a connectionless transport layer protocol, comprising:

subdividing each application data frame into a plurality of parts based on packet size criteria with respect to the network layer;

for each application data frame, encapsulating the parts of that application data frame into a transport layer packet by encapsulating each part into a separate network layer packet, the transport layer packet comprising a plurality of the separate network layer packets;

allocating the network layer packets to streams, each such stream being characterized by a desired data rate transmission characteristic; and transmitting the network layer packets of the streams to the at least one peer via the network according to the desired data rate transmission characteristics characterizing the streams, wherein,
the transmission is subjected to a limit on the amount of data to be sent; and
the limit is based at least in part on a communication received from the peer, wherein the communication received from the peer includes at least an indication of an amount of buffering available at the peer to hold the data destined to the peer from the at least one application via the network interface circuitry.

2. The method of claim 1, wherein:
the packet size criteria with respect to the network layer is a maximum packet size constraint for transmission of data from the intelligent network interface circuitry out to the network.

3. The method of claim 1, wherein:
subdividing the application payload data into parts is based at least in part on satisfying a fixed packet size constraint for transmission of data from the intelligent network interface circuitry out to the network.

4. The method of claim 1, further comprising:
receiving application layer data from the host; and
subdividing the application layer data into the at least one connectionless transport layer transmission protocol packet based on application level framing information.

5. The method of claim 1, wherein:
notwithstanding the desired data rate transmission characteristics, regulating the network layer packets transmitting step is additionally subject to processing based on priorities associated with the streams.

6. The method of claim 1, wherein:
the connectionless transport layer protocol is UDP.

7. A method of operating intelligent network interface circuitry to facilitate the transfer of data between at least one application, executing on a host, and at least one peer via a network, wherein data destined for the at least one peer is provided from the at least one application, via the network interface circuitry, for transmission from the intelligent network interface circuitry to the at least one peer via the network, encapsulated according to a connectionless transport layer protocol, the method comprising:

processing at least one connectionless transport layer protocol packet by subdividing the at least one connectionless transport layer protocol packet into a plurality of network layer packets;

managing modulation event tokens, including graduating modulation event tokens according to desired data transmission rate characteristics;

transmitting the network layer packets to the at least one peer via the network in part as a result of processing graduated modulation event tokens; and feeding back a result of the processing step to cause a modulation event token to be provided to the modulation event tokens managing step;

wherein the modulation event tokens managing step includes categorizing the modulation event tokens, such that each category of modulation event tokens corresponds to a separate desired data rate transmission characteristic, wherein, the transmission is subjected to a limit on the amount of data to be sent; and the limit is based at least in part on a communication received from the peer, wherein the communication received from the peer includes at least an indication of an amount of buffering available at the peer to hold the data destined to the peer from the at least one application via the network interface circuitry.

8. The method of claim 7, wherein:

subdividing the at least one connectionless transport layer protocol packet into a plurality of network layer packets is based on packet size criteria with respect to the network layer.

9. The method of claim 7, wherein:

subdividing the at least one connectionless transport layer protocol packet into a plurality of network layer packets includes preserving application level framing of the application data contained in the at least one connectionless transport layer protocol packet.

10. The method of claim 9, wherein:

subdividing the at least one connectionless transport layer protocol packet into a plurality of network layer packets includes, for connectionless transport layer protocol packets that exceed a packet size constraint, fragmenting the data according to the IP protocol.

11. The method of claim 7, wherein:

the modulation event tokens managing step includes providing the modulation event tokens to the network layer packets transmitting step, wherein the modulation event tokens in each category are provided to the network layer packets transmitting step with a timing that corresponds to the desired rate transmission characteristic to which that category corresponds.

12. The method of claim 11, wherein:

notwithstanding the desired rate transmission characteristics, the step of providing the modulation event tokens to the network layer packets transmitting step is additionally subject to priority processing based on priorities associated with the categories; and the priorities associated with the categories are based at least in part on an amount of data to be transmitted for the separate categories.

13. The method of claim 7, wherein:

a data structure is provided that holds the modulation event tokens; and the modulation event tokens managing step includes managing the storage of modulation event tokens into the data structure based on the fed back result of the processing step and retrieving modulation event tokens out of the data structure based on the desired data rate transmission characteristics; and the data structure includes a plurality of portions, each portion corresponding to a separate desired data rate transmission characteristic.

14. The method of claim 13, wherein the modulation event tokens managing step includes separately managing the retrieving of modulation event tokens out of each portion of the data structure based on the separate desired data rate transmission characteristic to which that portion of the data structure corresponds.

15. The method of claim 14, wherein:

at least some of the desired data rate transmission characteristic indications indicate a desired shaping characteristic.

16. The method of claim 7, wherein:

the modulation event processing step includes the determination of the size of each packet.

17. A method of operating intelligent network interface circuitry to facilitate the transfer of application payload data between at least one application, executing on a host, and at least one peer via a network, comprising:

forming a connectionless transport layer protocol segment by fragmenting the application payload data into a plurality of connectionless transport layer protocol fragments encapsulated in network layer packets;

providing, in one of the plurality of fragments, a header that includes a characterization of the connectionless transport layer protocol segment, according to the connectionless transport layer protocol; and modulating the transmission of the network layer packets out to the network, wherein the network layer packet, encapsulating the fragment in which the header is provided, is transmitted after at least one of the network layer packets encapsulating other fragments of the connectionless transport layer protocol segment, wherein, the transmission is subjected to a limit on the amount of data to be sent; and the limit is based at least in part on a communication received from the peer, wherein the communication received from the peer includes at least an indication of an amount of buffering available at the peer to hold the data destined to the peer from the at least one application via the network interface circuitry.

18. The method of claim 17, further comprising:

prior to the fragmenting step, determining whether to perform the fragmenting step including processing a packet size constraint with respect to transmission of network layer packets over the network.

19. The method of claim 17, wherein:

the header is sent in an encapsulated fragment that does not include accompanying application payload data.

20. The method of claim 17, wherein:

at least part of the application payload data is held in a memory of the intelligent network interface circuitry prior to being transmitted over the network in one or more network layer packets; and as a result of the modulation event processing step, application level framing is recovered at least in part through accessing the memory.

21. A method to facilitate the transfer of application payload data between at least one application, executing on a host computer, and at least one peer via a network, wherein application payload data destined for the at least one peer is provided from the at least one application to intelligent network interface circuitry, the method comprising:

operating the intelligent network interface circuitry to encapsulate the application payload data according to a connectionless transport layer protocol, into at least one stream of connectionless transport layer protocol packets, and further according to a network layer protocol;

transmitting the network layer packets from the intelligent network interface circuitry out to the network for transmission to the at least one peer;

controlling the transmitting step to control the flow of transmitting the at least one stream out to the network, wherein controlling the flow of transmitting the at least one stream out to the network is based on information that is received by the intelligent network interface circuitry out of band from the at least one peer via the network with respect to communication according to the connectionless transport layer protocol, wherein the information that is received by the intelligent network interface circuitry out of band from the at least one peer includes at least an indication of an amount of buffering available at the at least one peer to hold the data destined to the peer from the at least one application via the network interface circuitry.

22. A method of operating intelligent network interface circuitry to facilitate the transfer of data between at least one application, executing on a host, and at least one peer via a network, wherein data destined for the at least one peer is provided from the at least one application, via the network interface circuitry, for transmission from the intelligent network interface circuitry to the at least one peer via the network, encapsulated according to a connectionless transport layer protocol, the method comprising:

processing at least one connectionless transport layer protocol packet by subdividing the at least one connectionless transport layer protocol packet into a plurality of network layer packets;

managing modulation event tokens, including graduating modulation event tokens according to desired data transmission rate characteristics;

transmitting the network layer packets to the at least one peer via the network in part as a result of processing graduated modulation event tokens; and feeding back a result of the processing step to cause a modulation event token to be provided to the modulation event tokens managing step;

wherein the modulation event tokens managing step includes categorizing the modulation event tokens, such that each category of modulation event tokens corresponds to a separate desired data rate transmission characteristic;

a data structure is provided that holds the modulation event tokens; and the modulation event tokens managing step includes managing the storage of modulation event tokens into the data structure based on the fed back result of the processing step and retrieving modulation event tokens out of the data structure based on the desired data rate transmission characteristics; and the data structure includes a plurality of portions, each portion corresponding to a separate desired data rate transmission characteristic.

23. The method of claim 22, wherein the modulation event tokens managing step includes separately managing the retrieving of modulation event tokens out of each portion of the data structure based on the separate desired data rate transmission characteristic to which that portion of the data structure corresponds.

24. The method of claim 23, wherein:

at least some of the desired data rate transmission characteristic indications indicate a desired shaping characteristic.

25. A method of operating intelligent network interface circuitry to facilitate the transfer of application data between at least one application, executing on a host, and at least one peer via a network, wherein application data destined for the at least one peer is provided from the at least one application in frames, via the network interface circuitry, for transmission from the intelligent network interface circuitry to the at least one peer via the network encapsulated according to a connectionless transport layer protocol, comprising:

subdividing each application data frame into a plurality of parts based on packet size criteria with respect to the network layer;

for each application data frame, encapsulating the parts of that application data frame into a transport layer packet by encapsulating each part into a separate network layer packet, the transport layer packet comprising a plurality of the separate network layer packets;

allocating the network layer packets to streams, each such stream being characterized by a desired data rate transmission characteristic; and transmitting the network layer packets of the streams to the at least one peer via the network according to the desired data rate transmission characteristics characterizing the streams, wherein, the transmission is subjected to a limit on the amount of data to be sent; and the limit is based at least in part on a communication provided from beyond the intelligent network interface circuitry, that includes at least information indicative of a state of the network and further, wherein the communication received from beyond the intelligent network interface circuitry additionally includes information indicative of an amount of buffering available at the at least one peer.

* * * * *